United States Patent
Maczuba

(10) Patent No.: US 9,465,725 B2
(45) Date of Patent: *Oct. 11, 2016

(54) SOFTWARE DEFECT REPORTING

(71) Applicant: International Business Machines Corporation, Armonk, NY (US)

(72) Inventor: Jed Maczuba, Windham, NH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/330,187

(22) Filed: Jul. 14, 2014

(65) Prior Publication Data

US 2014/0325487 A1    Oct. 30, 2014

Related U.S. Application Data

(63) Continuation of application No. 12/759,829, filed on Apr. 14, 2010, now Pat. No. 8,813,039.

(51) Int. Cl.
*G06F 9/44* (2006.01)
*G06F 11/36* (2006.01)
*G06F 11/07* (2006.01)

(52) U.S. Cl.
CPC ....... *G06F 11/3688* (2013.01); *G06F 11/0706* (2013.01); *G06F 11/0778* (2013.01); *G06F 11/3692* (2013.01)

(58) Field of Classification Search
CPC ........... G06F 11/3692; G06F 11/0742; G06F 11/3688; G06F 11/0706; G06F 11/0778
See application file for complete search history.

(56) References Cited

U.S. PATENT DOCUMENTS

| | | | |
|---|---|---|---|
| 5,301,118 A | 4/1994 | Heck et al. |
| 5,361,352 A | 11/1994 | Iwasawa et al. |
| 6,336,217 B1 | 1/2002 | D'Anjou et al. |
| 6,477,471 B1 | 11/2002 | Hedstrom et al. |
| 6,513,154 B1 | 1/2003 | Porterfield |

(Continued)

OTHER PUBLICATIONS

Nathaniel Ayewah et al. "Evaluating Static Analysis Defect Warnings on Production Software", [Online], 2007, pp. 1-7, [Retrieved from internet on Jun. 18, 2016], <http://delivery.acm.org/10.1145/1260000/1251536/p1-ayewah.pdf>.*

(Continued)

*Primary Examiner* — Thuy Dao
*Assistant Examiner* — Ziaul A Chowdhury
(74) *Attorney, Agent, or Firm* — John R. Pivnichny; Hunter E. Webb; Keohane & D'Alessandro PLLC

(57) ABSTRACT

Provided are approaches for software defect reporting. Specifically, one approach provides identifying a software defect; generating a software defect report, wherein the software defect report is generated in real-time as the software defect is identified during testing of the test case, wherein the software defect report is submitted by a testing entity to a software developer responsible for creating a software product having the software defect, and wherein the defect report contains information to identify the location of the software defect in the application code of the software product; determining if the software defect report information is complete; and if the software defect report information is not complete, the updating the defect report information, determining if the software defect is reproducible, and recreating the software defect in the case that the software defect is reproducible.

12 Claims, 8 Drawing Sheets

(56) References Cited

U.S. PATENT DOCUMENTS

| | | |
|---|---|---|
| 6,530,076 B1 | 3/2003 | Ryan et al. |
| 6,593,940 B1 | 7/2003 | Petersen et al. |
| 7,194,664 B1 | 3/2007 | Fung et al. |
| 7,293,201 B2 | 11/2007 | Ansari |
| 7,406,685 B2 | 7/2008 | Fleehart et al. |
| 7,475,286 B2 | 1/2009 | Altaf et al. |
| 7,487,406 B2 | 2/2009 | Kobrosly et al. |
| 7,503,037 B2 | 3/2009 | Banerjee et al. |
| 7,519,604 B2 | 4/2009 | Gomes et al. |
| 7,603,660 B2 | 10/2009 | Davia et al. |
| 7,607,046 B1 | 10/2009 | Bruckhaus |
| 7,617,423 B2 | 11/2009 | Patel et al. |
| 7,774,757 B1 | 8/2010 | Awasthi et al. |
| 7,971,193 B2 | 6/2011 | Li et al. |
| 7,987,390 B2 | 7/2011 | Chandrasekaran |
| 8,074,119 B1 | 12/2011 | Rao et al. |
| 8,151,248 B1* | 4/2012 | Butler et al. .................. 717/124 |
| 8,276,126 B2 | 9/2012 | Farnham et al. |
| 8,429,454 B2 | 4/2013 | Yuan et al. |
| 8,453,027 B2 | 5/2013 | Bartz et al. |
| 2002/0073403 A1 | 6/2002 | Fleehart et al. |
| 2002/0116153 A1* | 8/2002 | Wybouw-Cognard G06F 11/3688 702/186 |
| 2003/0018952 A1 | 1/2003 | Roetzheim |
| 2003/0159133 A1* | 8/2003 | Ferri .................. G06F 11/3636 717/130 |
| 2004/0128653 A1 | 7/2004 | Arcand |
| 2004/0153791 A1 | 8/2004 | Arend |
| 2004/0153833 A1* | 8/2004 | Deacon ............... G06F 11/0727 714/38.14 |
| 2005/0066234 A1* | 3/2005 | Darringer ........... G06F 11/3688 714/38.1 |
| 2005/0097516 A1 | 5/2005 | Donnelly et al. |
| 2005/0114842 A1 | 5/2005 | Fleehart et al. |
| 2006/0085132 A1* | 4/2006 | Sharma ............... G06F 11/3688 702/1 |
| 2006/0156077 A1 | 7/2006 | Altaf et al. |
| 2006/0195731 A1* | 8/2006 | Patterson ............ G06F 11/0778 714/723 |
| 2006/0282419 A1 | 12/2006 | Sen et al. |
| 2007/0089092 A1* | 4/2007 | Schmidt et al. ............. 717/126 |
| 2007/0089094 A1 | 4/2007 | Levine et al. |
| 2007/0168343 A1 | 7/2007 | Best et al. |
| 2007/0168757 A1 | 7/2007 | Kobrosly et al. |
| 2008/0046786 A1* | 2/2008 | Patel et al. ................... 714/100 |
| 2008/0065577 A1 | 3/2008 | Chefalas et al. |
| 2008/0126878 A1* | 5/2008 | Best .................... G06F 11/3636 714/45 |
| 2008/0172655 A1* | 7/2008 | Davia ....................... G06F 8/77 717/130 |
| 2008/0178155 A1 | 7/2008 | Gogh et al. |
| 2008/0229159 A1 | 9/2008 | Viljoen |
| 2009/0070639 A1 | 3/2009 | Langford et al. |
| 2009/0132861 A1* | 5/2009 | Costa .................. G06F 11/0748 714/45 |
| 2009/0138766 A1* | 5/2009 | Rui ..................... G06F 11/0778 714/57 |
| 2010/0083043 A1* | 4/2010 | Niioka ................ G06F 11/0706 714/23 |
| 2010/0198799 A1 | 8/2010 | Krishnan et al. |
| 2011/0145628 A1* | 6/2011 | Wilson ................ G06F 11/3692 714/4.2 |
| 2011/0252405 A1* | 10/2011 | Meirman et al. ............. 717/125 |
| 2013/0024847 A1* | 1/2013 | Browne ............. G06F 11/3692 717/131 |
| 2014/0304686 A1* | 10/2014 | Hasegawa ........... G06F 11/3692 717/125 |

OTHER PUBLICATIONS

Pieter Hooimeijer et al. "Modeling Bug Report Quality", [Online], 2007, pp. 34-43, [Retrieved from internet on Jun. 18, 2016], <http://citeseerx.ist.psu.edu/viewdoc/download?doi=10.1.1.134.2702&rep=rep1&type=pdf>.*

Tim Menzies et al. "Automated Severity Assessment of Software Defect Reports", [Online], 2008, pp. 1-11, [Retrieved from internet on Jun. 18, 2016], <http://menzies.us/pdf/08severis.pdf>.*

Nicolas Bettenburg et al. "What Makes a Good Bug Report", [Online], 2008, pp. 1-11, [Retrieved from internet on Jun. 18, 2016], <http://delivery.acm.org/10.1145/1460000/1453146/p308-bettenburg.pdf>.*

Pieter Hooimeijer et al., "Modeling Bug Report Quality", ASE'07, Nov. 5-9, 2007, Atlanta, Georgia, Copyright 2007, pp. 34-43.

Parastoo Mohagheghi et al., "An Empirical Study of Software Reuse vs. Defect-Density and Stability", Proceedings of the 26th International Conference on Software Engineering (ICSE'04), Copyright 2004 IEEE, 11 pages.

Tim Menzies et al., "Automated Severity Assessment of Software Defect Reports", Copyright 2008 IEEE, pp. 346-355.

Ziaul A. Chowdhury, USPTO Office Action, U.S. Appl. No. 12/759,829, Mail Date Jan. 2, 2013, 26 pages.

Ziaul A. Chowdhury, USPTO Final Office Action, U.S. Appl. No. 12/759,829, Notification Date Jun. 27, 2013, 44 pages.

Ziaul A. Chowdhury, USPTO Notice of Allowance and Fee(s) Due, U.S. Appl. No. 12/759,829, Date Mailed Apr. 14, 2014, 19 pages.

* cited by examiner

Figure 8

Update User Profile 802

First 804
Last 806
Street 808
City 810
State 812
Zip Code 814

OK 816
Cancel 816

800

SOFTWARE DEFECT REPORTING

CROSS-REFERENCE TO RELATED APPLICATION

This application is a continuation of, and claims the benefit of, co-pending and co-owned U.S. patent application Ser. No. 12/759,829, filed Apr. 14, 2010, the entire contents of which are herein incorporated by reference.

FIELD OF THE INVENTION

Aspects of the present invention provides for a method and a system for improving the defect reporting mechanism in the software quality automated process using automated log scanning

BACKGROUND OF THE INVENTION

A software bug, or defect, is the common term used to describe an error, flaw, mistake, failure or fault in a computer program or system that produces an incorrect or unexpected result or causes it to behave in unintended ways. Most bugs arise from mistakes and errors made by people in either a program's source code or its design. Others may be caused by compilers producing incorrect code.

Bugs can have a wide variety of effects with varying levels of inconvenience to the user of the program. Some bugs have only a subtle effect on the program's functionality and may thus lie undetected for long time while more serious bugs may cause the program to crash or freeze. Other bugs may have more serious ramifications such as security bugs that might for example enable a malicious user to By-pass access controls in order to obtain unauthorized privileges.

The risk (likelihood of occurrence and impact) of software bugs is immense. Virtually every business in the United States and across the globe depends on software for the development, production, distribution and support of products and services. Entire industries alone have been enabled by low-cost computational capabilities supplied by computers and software.

According to market researcher DataMonitor, the size of the worldwide software industry in 2008 was US$303.8 billion, an increase of 6.5% compared to 2007. Americas account for 42.6% of the global software market's value. DataMonitor forecasts that in 2013, the global software market will have a value of US$457 billion, an increase of 50.5% since 2008.

In 2002, a study commissioned by the US Department of Commerce's National Institute of Standards and Technology concluded that software bugs, or errors, are so prevalent and so detrimental that they cost the US economy an estimated $59 billion annually, or about 0.6 percent of the gross domestic product. The Department also concluded that at the national level over half the costs of software bugs are borne by software users and the remainder by the software developers/vendors. The study also found that, although all errors cannot be removed, more than a third of these costs, or an estimated $22.2 billion, could be eliminated by an improved testing infrastructure that enables earlier and more effective identification and removal of software defects.

A number of inventions have been established that attempt to improve the quality of software. Many of these prescribe techniques for identifying defects earlier in the development cycle, automating the bug, or defect, identification process or planning through predicting modeling. However these approaches focus purely on the planning, management and prevention of software defects. They fail, however, to address the potentially more important issue of how to adequately address defects once they have been identified.

SUMMARY OF THE INVENTION

The present invention ties together the identification of a defect during testing with the supporting application code on the systems that led to the generation of the defect. The association between the two is through the use of a unique trace identification, or Trace ID. This Trace ID is unique to each interaction between the consumer (e.g., client browser) and the provider system(s) (web application servers, back office systems, etc.). When a potential defect is identified by the end user or tester, the present invention will "collect" the associated log messages using the unique Trace ID and attaches those to the defect. The software developer providing the defect triage can then readily review the associated log files without having to manually search the supporting log files manually.

One embodiment of the present invention is a method comprising: a computer identifying a software defect; the computer generating a software defect report, wherein the software defect report is generated in real-time as the software defect is identified during testing of the test case, wherein the software defect report is submitted by a testing entity to a software developer responsible for creating a software product having the software defect, and wherein the defect report contains information to identify the location of the software defect in the application code of the software product; the computer determining if the software defect report information is complete; and if the software defect report information is not complete, the computer updating the defect report information, determining if the software defect is reproducible, and recreating the software defect in the case that the software defect is reproducible.

Another embodiment of the present invention is a computer system comprising: a memory medium comprising program instructions; a bus coupled to the memory medium; and a processor, for executing the program instructions, coupled to an input controller via the bus that when executing the program instructions causes the system to: identify a software defect; generate a software defect report, wherein the software defect report is generated in real-time as the software defect is identified during testing of the test case, wherein the software defect report is submitted by a testing entity to a software developer responsible for creating a software product having the software defect, and wherein the defect report contains information to identify the location of the software defect in the application code of the software product; determine if the software defect report information is complete; and if the software defect report information is not complete, the computer updating the defect report information, determining if the software defect is reproducible, and recreating the software defect in the case that the software defect is reproducible.

Yet another embodiment of the present invention is a computer program product comprising a computer readable storage medium, and program instructions stored on the computer readable storage medium, to: identify a software defect; generate a software defect report, wherein the software defect report is generated in real-time as the software defect is identified during testing of the test case, wherein the software defect report is submitted by a testing entity to a software developer responsible for creating a software product having the software defect, and wherein the defect report contains information to identify the location of the software defect in the application code of the software product; determine if the software defect report information is complete; and if the software defect report information is not complete, the computer updating the defect report information, determining if the software defect is reproducible, and recreating the software defect in the case that the software defect is reproducible.

BRIEF DESCRIPTION OF THE DRAWINGS

These and other features of this invention will be more readily understood from the following detailed description of the various aspects of the invention taken in conjunction with the accompanying drawings in which:

FIG. 8 illustrates a sample application screen that may result in an error in a transactional application.

Figure 1:
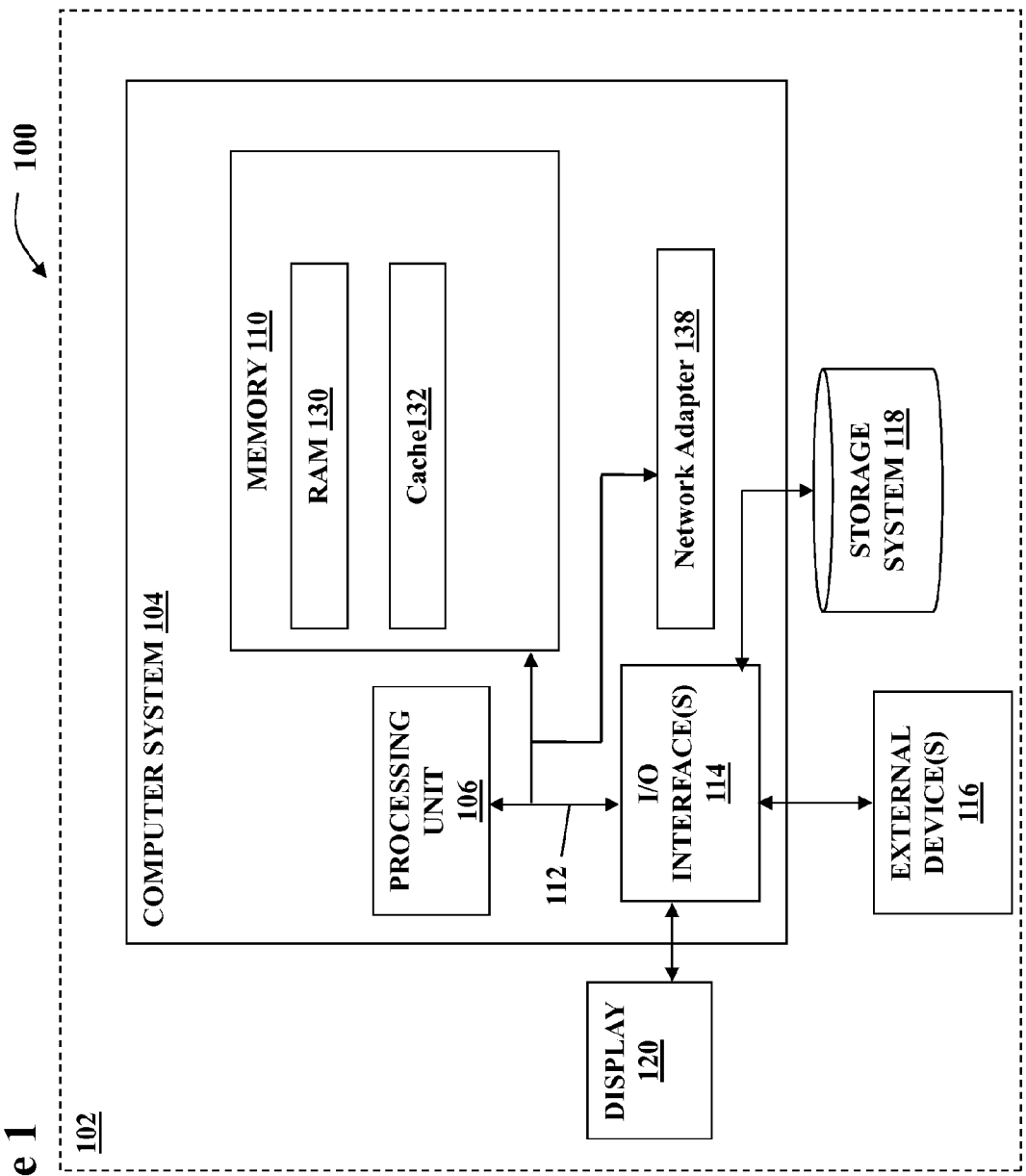
FIG. 1 shows a data processing system suitable for implementing an embodiment of the present invention.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE DRAWINGS

The present invention, which meets the needs identified above, is a method and system for decreasing the overall time required to resolve a software defect by providing the software developer with more complete and timelier information obtained at the point the defect is identified. The present invention enhances the typical data attached to the defect so that the analysis and discovery period of the defect is reduced and the overall time for defect resolution is reduced. The enhanced data includes details about the transaction being executed and any exception stack traces generated during the execution of the transaction.

The present invention has several advantages over previously mentioned prior systems. While other systems attempt to improve the defect identification process, this invention attempts to decrease the overall response time to deliver a fix. By automating activities that would normally be performed manually, the time from initial defect identification to defect resolution may be significantly reduced by several factors.

Typically, once a defect is identified, logged, verified and delivered to the software developer, the developer will then use the base information submitted by the tester or end user as a starting point for his/her analysis. The goal of the analysis step is to identify where within the code the defect originated. The analysis may follow one of several process paths depending on what point in the product lifecycle the defect was identified (e.g., development, testing, production, etc.), what level of information was included (e.g., steps to reproduce the defect), and whether the user has the ability to recreate the defect (i.e., the defect may arise only in certain circumstances that may not be easily reproducible). Regardless, in a best case scenario, this analysis step indeed a costly part of the defect resolution process.

The present invention ties together the identification of a defect during testing with the supporting application code on the systems that led to the generation of the defect. The association between the two is through the use of a unique trace identification, or Trace ID. This Trace ID is unique to each interaction between the consumer (e.g., client browser) and the provider system(s) (web application server, back office systems, etc). When a potential defect is identified by the end user or tester, the present invention will "collect" the associated log messages using the unique Trace ID and attaches those to the defect. The software developer providing the defect triage can then readily review the associated log files without having to manually search the supporting log files manually.

One advantage of this invention is that it is concerned with providing the relevant information at the point of appearance of the defect. By gathering this information real-time, the need to reproduce the defect in a development or test environment after the fact is significantly reduced. This eliminates a significant costly step that is part of the typical development defect fix lifecycle today. As systems become more complex and more widespread, the present invention will play a significant role in improving the overall quality of software.

A data processing system 100, such as system 102 shown in FIG. 1, suitable for storing and/or executing program code of the present invention will include a computer system 104 having at least one processor (processing unit 106) coupled directly or indirectly to memory elements through a system bus 112. Computer system 104 may be a client, e.g., a browser, or a server. The memory elements can include local memory (RAM 130) employed during actual execution of the program code, bulk storage (storage 118), and cache memories (cache 132) that provide temporary storage of at least some program code in order to reduce the number of times code must be retrieved from bulk storage 118 during execution. Input/output or I/O devices (external devices 116) (including but not limited to keyboards, displays (display 120), pointing devices, etc.) can be coupled to the system either directly or through intervening I/O controllers (I/O interface(s) 114).

Figure 2:
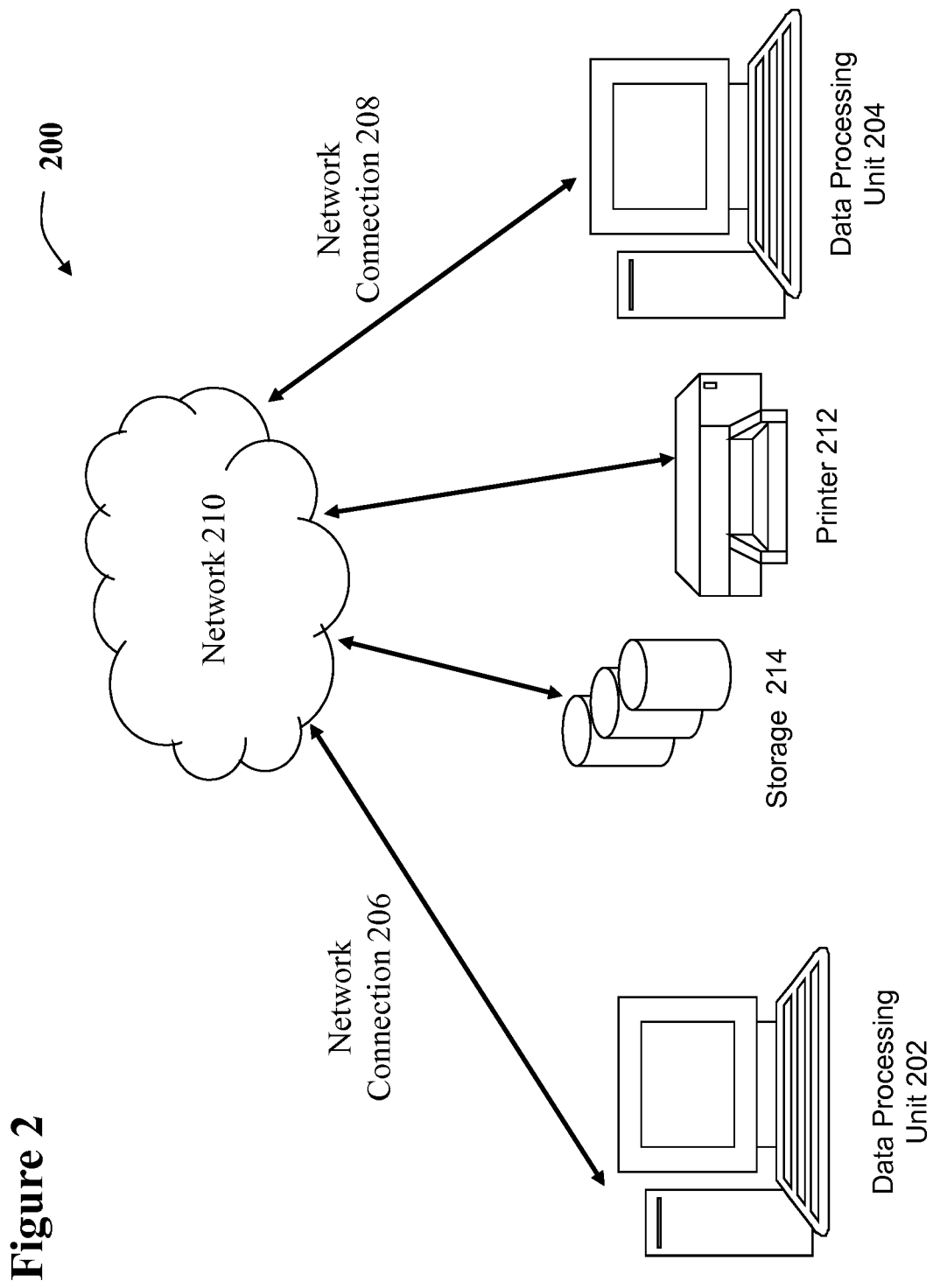
FIG. 2 shows a network which would work with an embodiment of the present invention.

Network adapters (network adapter 138) may also be coupled to the system 200 to enable the data processing system (as shown in FIG. 2, data processing unit 202) to become coupled through network connections (network connection 208) to other data processing systems (data processing unit 204), remote printers (printer 212) and/or storage devices (storage 214) through intervening private and/or public networks (network 210).

Figure 3:
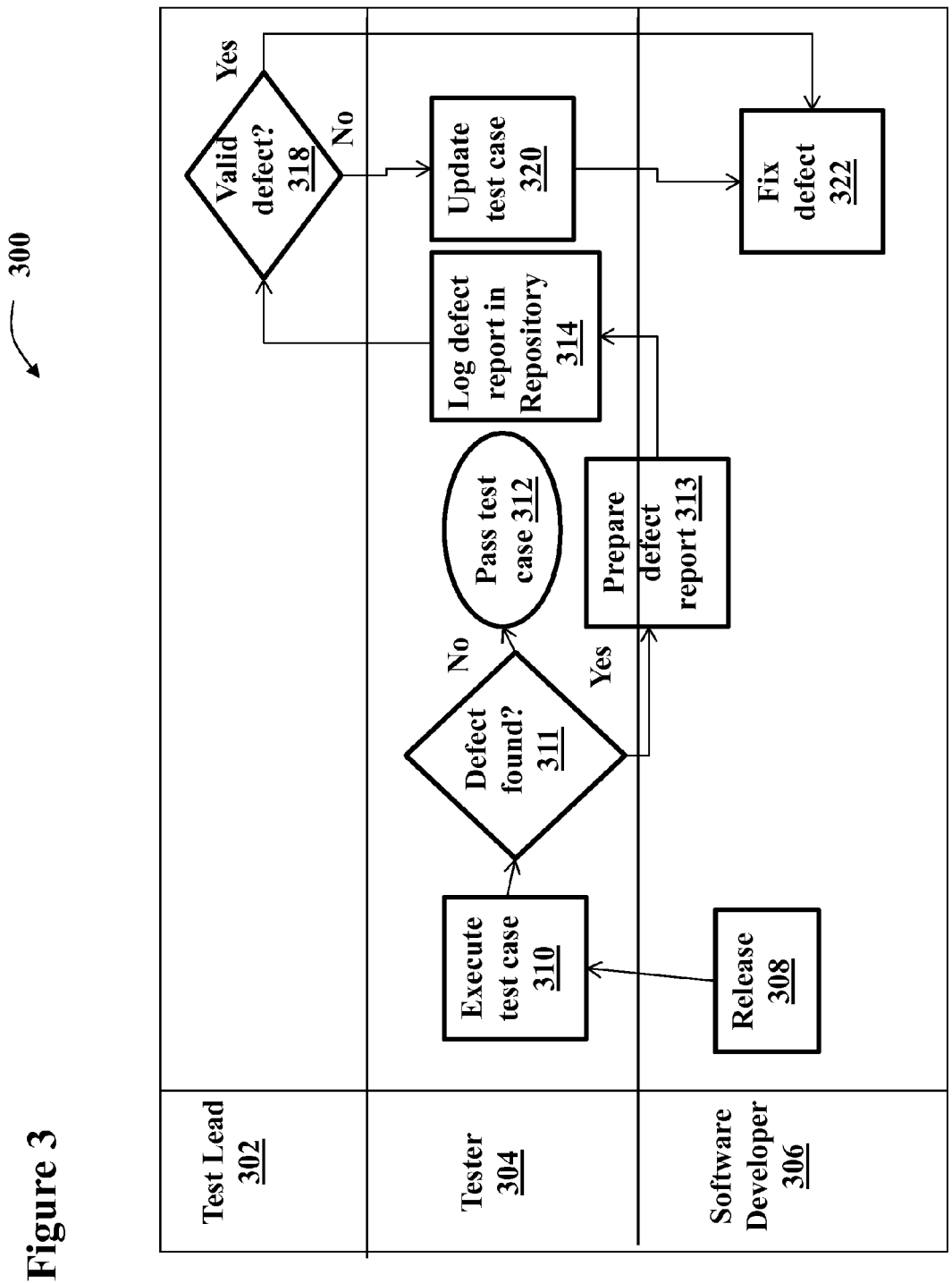
FIG. 3 illustrates an embodiment of a method of an "As-Is Identification Process" wherein the defect is identified during the testing phase.

FIG. 3 illustrates an "As-Is Defect Identification Process" 300 for identifying defects during a testing phase of a software product having a test lead 302, a tester 304 and a software developer 306. FIG. 3 highlights a typical workflow executed during the testing phase of a software component. In this scenario, the software developer 306 releases software to tester 304 at 308, then tester 304 executes a test case at 310 in order to satisfy a particular test strategy objective. A test case is a pre-defined series of steps designed to satisfy a particular testing objective (e.g., functional verification of business requirement). A properly documented test case may contain basic information about the purpose of the test case, execution steps, preconditions and expected results (see sample test case). If the actual results or behavior observed during execution varies from the expected results, it is determined whether a defect is found at 311. If a defect is found at 311, a defect report is prepared at 313 and the defect report will be logged in a defect repository or other tracking mechanism at 314, the defect is passed to the test lead 302 at 318, where it is determined whether the defect was "valid" and, if not, the defect test is updated at 320 or, if so, the defect is fixed at 322. After the test case is updated at 320, the defect is fixed at 322. The logging of the defect report is of immediate concern to the present invention. Reporting mechanisms require limited information about the identified defect. For example, in a simple model the defect may simply contain a reference to the test case and the actual results that differed from the expected results.

Figure 4:
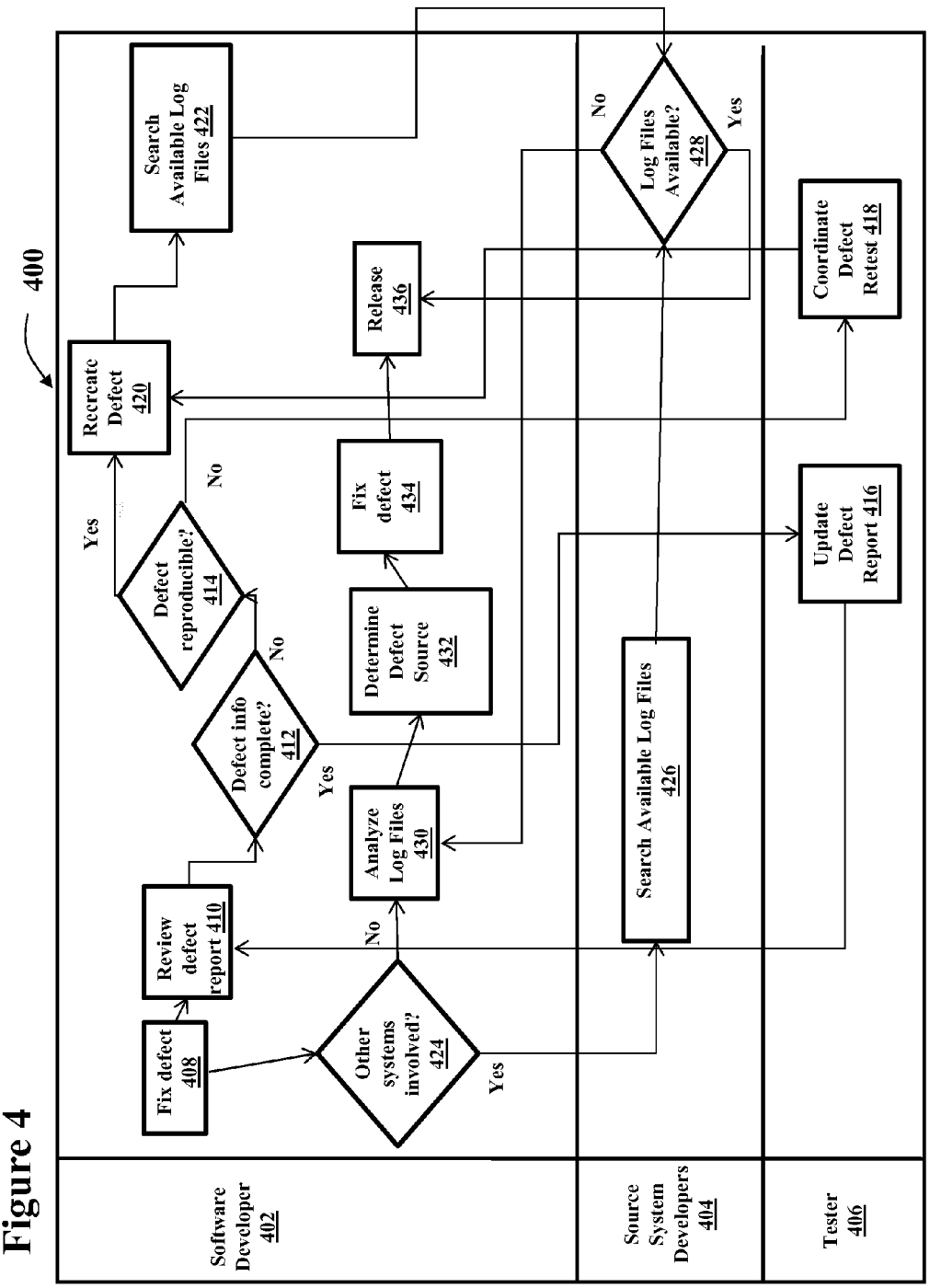
FIG. 4 illustrates an embodiment of a method of an "As-Is Fix Process".

FIG. 4 highlights a workflow, or method, 400 for an "As-Is Defect Fix Process" executed after the defect has been identified and logged. This process highlights a process 400 that a software developer 402 would execute when a bug, or defect, is received in his/her queue. There are source system developers 404 and a tester 406 in this process as well. At 408, the software developer 402 fixes a software defect, reviews a defect report at 410, determines whether the defect report information is complete at 412. If the defect information is complete, the defect report is updated at 416 and the process recycles at 410. If the defect information is incomplete, at 414, software developer 402 determines whether the defect is reproducible and, if not, tester 406 coordinates a defect retest at 418 and recreates the defect at 420. If software developer 402 determines that the defect is reproducible, software developer 402 recreates the defect at 420, searches available log files at 422, and determines if there is log data available at 428 and, if so, it is released at 436. If there is no log data available, log data files are analyzed at 430. If there are other systems involved at 424, source system developers 404 search available log files at 426 and determine whether there is log data available at 428 and the same process as described above as described above is followed. At 432, software developer 402 determines the defect source. At 434, the defect is fixed and, at 436, the software is released. In this process, the majority of steps (408-430 as shown in the figure) are focused on gathering the necessary information to understand the source of the defect (432 as shown in the figure). That is, identifying and locating the point in the source code that is either coded incorrectly or contains the flawed logic. Steps 408-430, as shown in the figure, are a significant contributor to the overall defect timeline. Gathering the necessary facts to understand what the user was doing that generated the defects can typically take up to 50% of the end-to-end process. There are several points in this process that can severely impede the software developer's ability to diagnose a defect root cause. For example, the identified defect may not contain the complete set of information for the developer to adequately understand the problem at hand (412). The defect may not be reproducible. Many transactional systems, for example, have complex data pre-conditional requirements. In addition, the systems themselves may not be "available" for the software developer to leverage. Test systems typically have restricted access in order to avoid corruption of test data. The third major hindrance may be when multiple systems are involved (424). In this scenario, the defect may arise by any of the systems involved with satisfying the specific user transaction. This multi-system scenario significantly increases the complexity in purely gathering the necessary log information to diagnose the problem.

Figure 5:
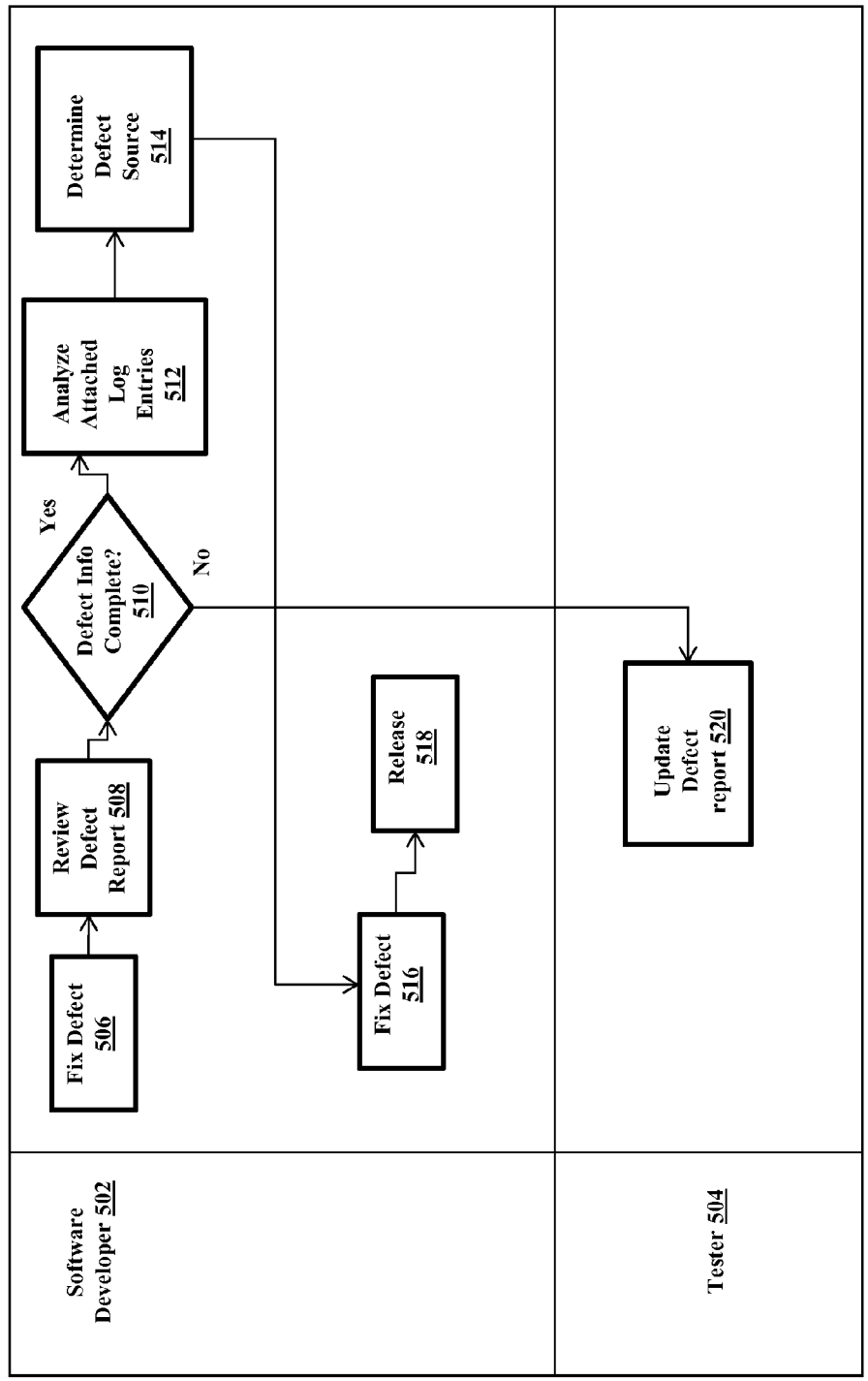
FIG. 5 illustrates an embodiment of a method of a "To-Be Defect Fix Process" of the present invention.

FIG. 5 highlights a proposed "To-Be Defect Process" workflow 500 that would be realized as part of the present invention having a software developer 502 and a tester 504. In this scenario, the steps between the time the defect is received by the software developer (506) to the time that the defect root cause is understood (514) is dramatically simplified. In addition, the overall timeframe would be reduced. The present invention expedites this process because the necessary information to perform the initial root cause analysis is captured at the point of defect identification and attached to the defect report submitted by the tester. This is different than the current process that requires a significant amount of manual user intervention.

FIG. 5 illustrates a process that begins at 506 where a defect is detected by software developer 502 and moves to 508 where software developer 502 reviews the defect report. At 510, software developer 502 determines whether the information in the defect report is complete and, if not, tester 504 updates the information in the defect report. But, if software developer 502 determines that the information in the defect report is complete, software developer 502 analyzes log entries, or files, at 512, determines the defect source at 514, fixes the defect at 516 and releases the software at 518.

Figure 6:
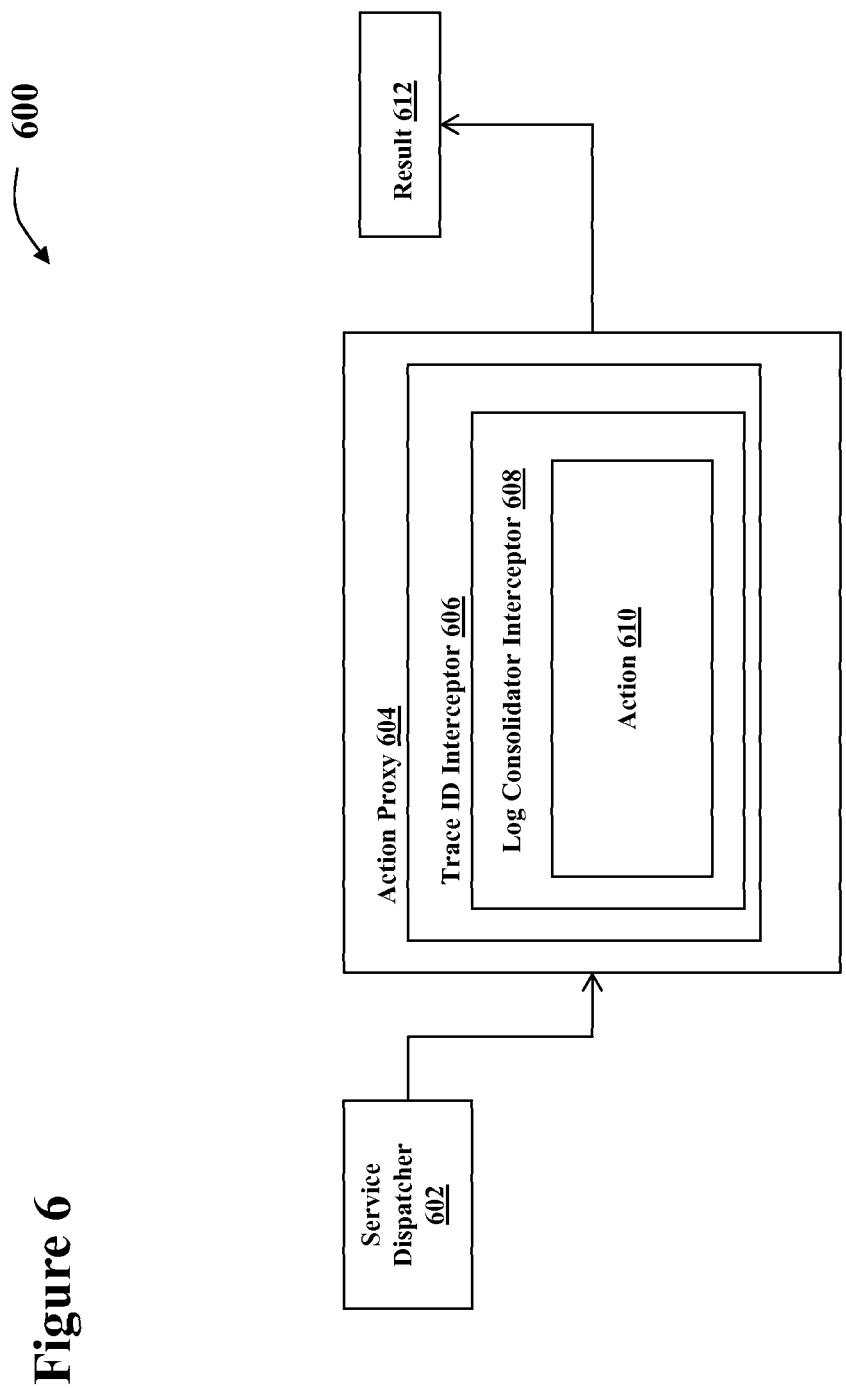
FIG. 6 illustrates an embodiment of a system showing interaction between the client and the server of the present invention.

FIG. 6 highlights the use of a standard Interceptor pattern 600 to enable the present invention in a typical software application. It shows a service/dispatcher 602 and an action proxy 604. In this, two Interceptors are leveraged: the Trace ID Interceptor 606 and a Log Consolidator Interceptor 608. Trace ID Interceptor 606 is responsible for intercepting outgoing results from service/dispatcher 602 and assigning a unique identifier. This unique identifier, or Trace ID, will then function as the primary key for the next request from the client to the backend systems. When a failure occurs, the Trace ID will be used to retrieve the pertinent information from the providing systems.

Log Consolidator Interceptor 608 is responsible for intercepting outgoing results and inspecting for the presence of errors. Should an error exist, Log Consolidator Interceptor 608 will create a result 612 and make a series of calls (Action 610) to the relevant source system to obtain the log details. This may be obtained asynchronously so as not to have a performance impact on the return call to the consuming application.

Figure 7:
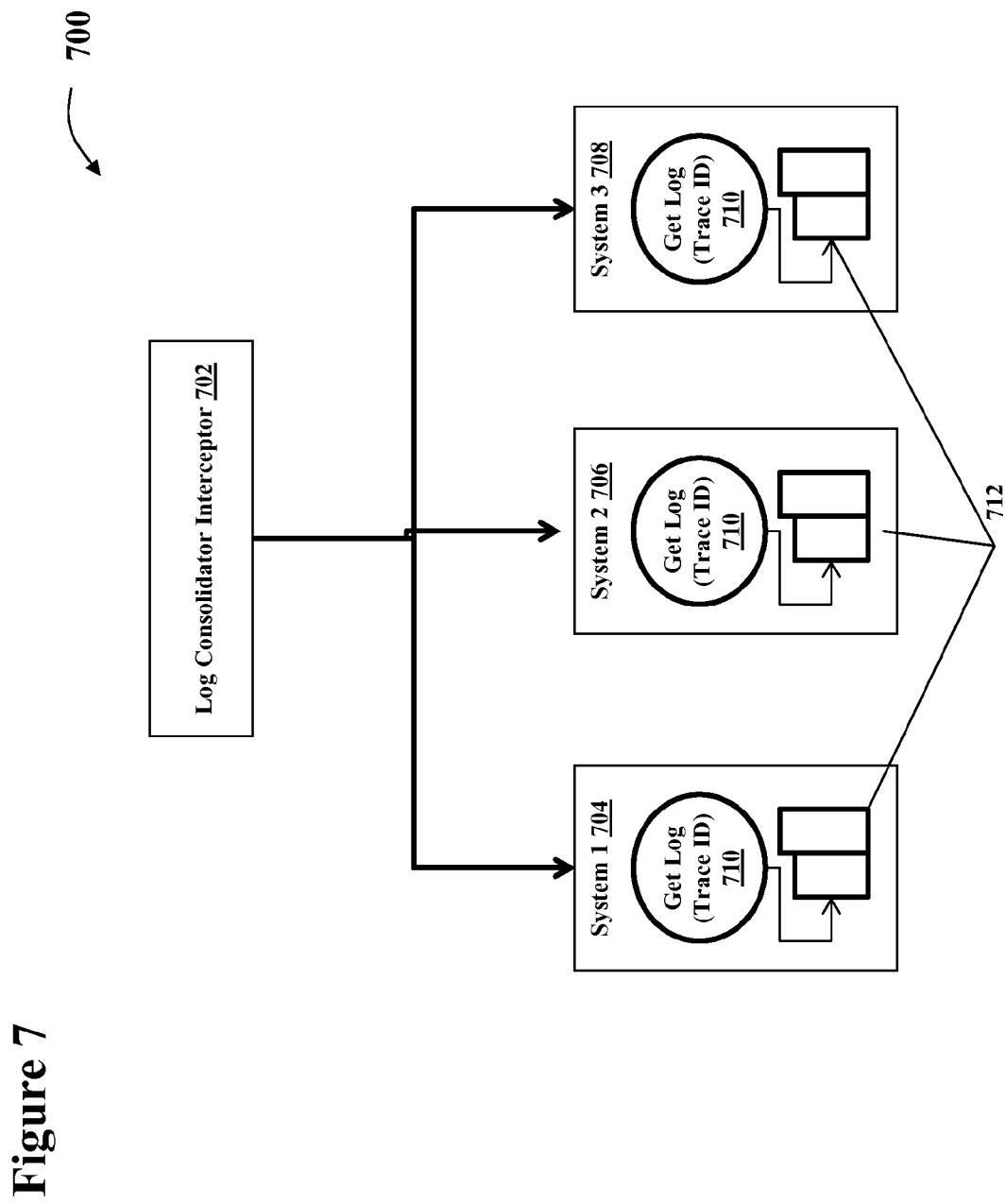
FIG. 7 illustrates an embodiment of a system showing a log consolidator interceptor and various systems.

As shown in FIG. 7, a system 700 has a Log Consolidator Interceptor 702 connected to systems 1 (704), 2 (706) and 3 (708). Each of the systems 1 (704), 2 (706) and 3 (708) have their own respective GetLogs 710 that are connected to log data 712. When the presence of errors is detected, the Log Consolidator Interceptor 702 will make calls to the source systems requesting the associated log information be obtained. The source systems will then search the available logs to obtain the trace information.

Figure 8:
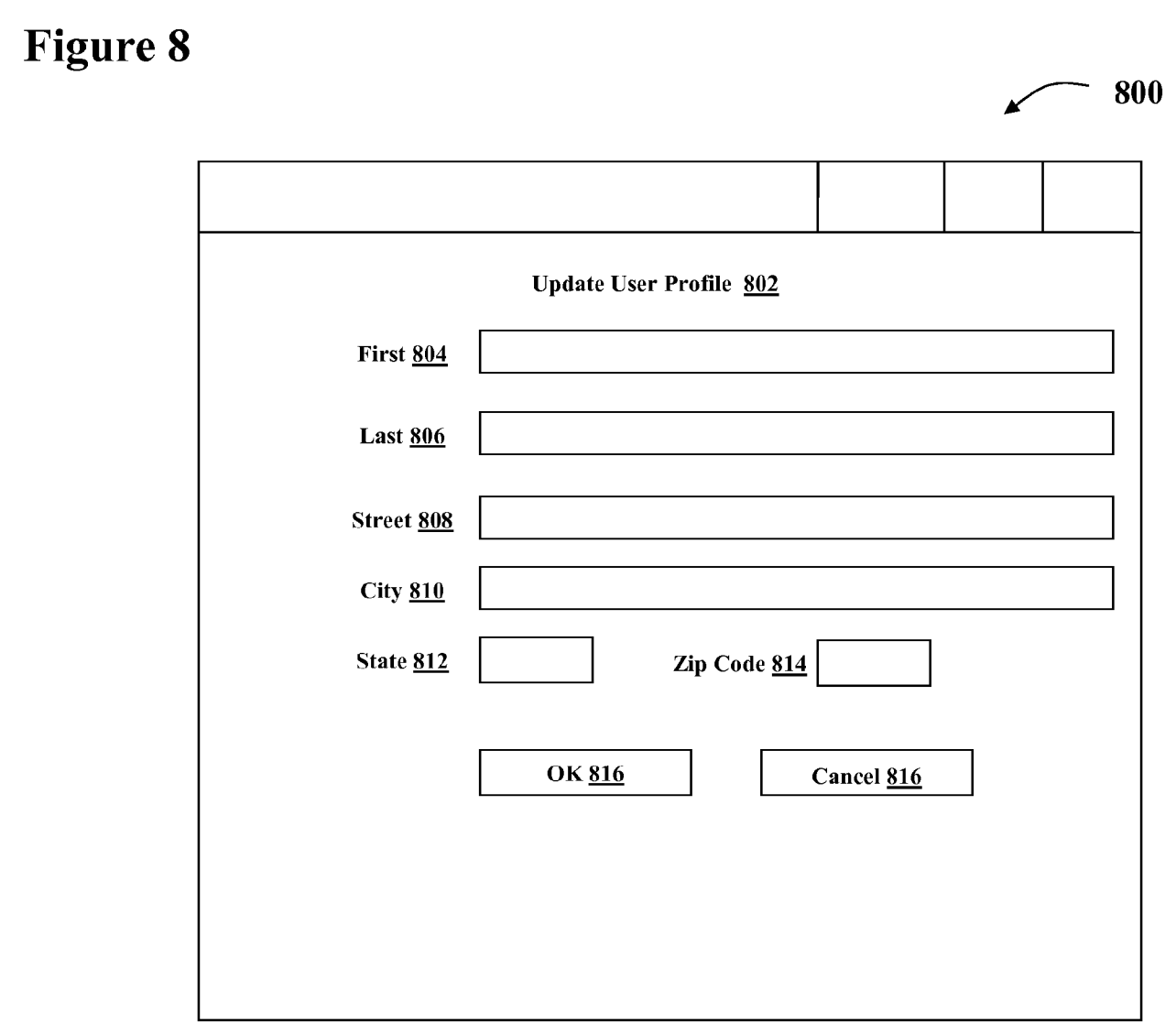

FIG. 8 illustrates a sample web application screen 800 that may result in a error in a transactional application. In this figure, the user specifies a series of information (update user profile 802), such as user name (804, 806), address (808, 810, 812, 814) and then clicks an 'OK' button (816) or otherwise presses a 'Cancel' button (818). If the 'OK' button is pressed, the data will then be posted to the server-side component for processing.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for improving the defect reporting mechanism in the software quality automated process using automated log scanning, it is understood that the invention further provides various alternative embodiments. For example, in one embodiment, the invention provides a computer-readable/useable medium that includes computer program code to enable a system for improving the defect reporting mechanism in the software quality automated process using automated log scanning. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for improving the defect reporting mechanism in the software quality automated process using automated log scanning. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a Solution Integrator, could offer to deploy a computer infrastructure for improving the defect reporting mechanism in the software quality automated process using automated log scanning. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method comprising:
assigning to each interaction with a software product being tested a unique trace ID;
a computer, in response to identifying a software defect, automatically associating the unique trace ID corresponding to the interaction during which the software defect occurred with log messages corresponding to the interaction;
the computer generating a software defect report, wherein the software defect report is generated in real-time as the software defect is identified during testing of a test case, wherein the software defect report is submitted by a testing entity to a software developer responsible for creating the software product having the software defect, and wherein the defect report contains the log messages collected using the unique trace ID that associates the software defect during execution of a testing case with application code on a source system that led to a generation of the defect to identify a location of the software defect in the application code of the software product;
the computer determining if the software defect report information is complete; and if the software defect report information is not complete, the computer updating the defect report information, determining if the software defect is reproducible, and recreating the software defect in the case that the software defect is reproducible.

2. The method as defined in claim 1 further comprising the computer analyzing log files in the case that the software defect report information is complete.

3. The method as defined in claim 2 further comprising, if the defect report information is complete, searching the log files, determining if the log files are available, and releasing the software.

4. The method as defined in claim 2 further comprising:
the computer determining a defect source;
the computer fixing the software defect; and
the computer releasing the software.

5. A computer system comprising:
a memory medium comprising program instructions;
a bus coupled to the memory medium; and
a processor, for executing the program instructions, coupled to an input controller via the bus that when executing the program instructions causes the system to:
assign to each interaction with a software product being tested a unique trace ID; automatically associate, in response to identifying a software defect the unique trace ID corresponding to the interaction during which the software defect occurred with log messages corresponding to the interaction;

generate a software defect report, wherein the software defect report is generated in real-time as the software defect is identified during testing of a test case, wherein the software defect report is submitted by a testing entity to a software developer responsible for creating a software product having the software defect, and wherein the defect report contains the log messages collected using the unique trace ID that associates the software defect during execution of a testing case with application code on a source system that led to a generation of the defect to identify a location of the software defect in the application code of the software product;

determine if the software defect report information is complete; and if the software defect report information is not complete, the computer updating the defect report information, determining if the software defect is reproducible, and recreating the software defect in the case that the software defect is reproducible.

6. The computer system as defined in claim 5, the program instructions further causing the system to analyze log files in the case that the software defect report information is complete.

7. The computer system as defined in claim 6, wherein if the defect report information is complete, the program instructions further causing the system to search the log files, determine if the log files are available, and release the software.

8. The computer system as defined in claim 6, the program instructions further causing the system to:
determine a defect source;
fix the software defect; and
release the software.

9. A computer program product comprising a non-transitory computer readable storage medium, and program instructions stored on the computer readable storage medium, to:

assign to each interaction with a software product being tested a unique trace ID; automatically associate, in response to identifying a software defect the unique trace ID corresponding to the interaction during which the software defect occurred with log messages corresponding to the interaction;

generate a software defect report, wherein the software defect report is generated in real-time as the software defect is identified during testing of a test case, wherein the software defect report is submitted by a testing entity to a software developer responsible for creating the software product having the software defect, and wherein the defect report contains the log messages collected using a unique trace ID that associates the software defect during execution of a testing case with application code on a source system that led to a generation of the defect to identify a location of the software defect in the application code of the software product;

determine if the software defect report information is complete; and if the software defect report information is not complete, the computer updating the defect report information, determining if the software defect is reproducible, and recreating the software defect in the case that the software defect is reproducible.

10. The computer program product as defined in claim 9, the program instructions further causing the system to analyze log files in the case that the software defect report information is complete.

11. The computer program product as defined in claim 9, wherein if the defect report information is complete, the program instructions further causing the system to search the log files, determine if the log files are available, and release the software.

12. The computer program product as defined in claim 9, the program instructions further causing the system to:
determine a defect source;
fix the software defect; and
release the software.

* * * * *